(12) United States Patent
Chatterji et al.

(10) Patent No.: US 7,205,263 B2
(45) Date of Patent: Apr. 17, 2007

(54) RECYCLABLE FOAMED FRACTURING FLUIDS AND METHODS OF USING THE SAME

(75) Inventors: Jiten Chatterji, Duncan, OK (US);
Bobby J. King, Duncan, OK (US);
Karen L. King, Duncan, OK (US)

(73) Assignee: Halliburton energy Services, Inc., Duncan, OK (US)

( * ) Notice: Subject to any disclaimer, the term of this patent is extended or adjusted under 35 U.S.C. 154(b) by 0 days.

(21) Appl. No.: 10/956,928

(22) Filed: Oct. 1, 2004

(65) Prior Publication Data

US 2005/0043188 A1    Feb. 24, 2005

Related U.S. Application Data

(62) Division of application No. 10/396,606, filed on Mar. 25, 2003, now Pat. No. 6,986,392.

(51) Int. Cl.
*C09K 8/62* (2006.01)
*C09K 8/68* (2006.01)

(52) U.S. Cl. .................. 507/202; 507/246; 507/922

(58) Field of Classification Search ............. 507/246, 507/245, 240, 253–255, 256, 259, 102, 202
See application file for complete search history.

(56) References Cited

U.S. PATENT DOCUMENTS

| | | | | |
|---|---|---|---|---|
| 3,303,896 | A | 2/1967 | Tillotson et al. ............. 175/69 |
| 3,572,439 | A | 3/1971 | Hutchison et al. ......... 166/309 |
| 3,591,513 | A * | 7/1971 | Tate ........................... 507/246 |
| 3,610,340 | A | 10/1971 | Hutchison et al. ......... 166/311 |
| 4,108,782 | A | 8/1978 | Thompson ............. 252/8.55 C |
| 4,113,631 | A | 9/1978 | Thompson ............. 252/8.55 C |
| 4,231,882 | A * | 11/1980 | Elphingstone et al. ...... 507/246 |
| 4,232,741 | A | 11/1980 | Richardson et al. ........ 166/281 |
| 4,301,016 | A | 11/1981 | Carriere et al. ........... 252/8.5 C |
| 4,324,669 | A * | 4/1982 | Norman et al. ............. 507/202 |
| 4,480,696 | A | 11/1984 | Almond et al. ............. 166/308 |
| 4,486,316 | A | 12/1984 | Carriere et al. .......... 252/8.5 C |
| RE32,302 | E | 12/1986 | Almond et al. ............. 166/308 |
| 4,627,495 | A | 12/1986 | Harris et al. ................ 166/280 |
| 4,664,851 | A | 5/1987 | Drent .................. 260/410.9 R |
| 4,694,906 | A | 9/1987 | Hutchins et al. ............ 166/294 |
| 4,796,702 | A * | 1/1989 | Scherubel ................ 166/308.6 |
| 4,809,783 | A | 3/1989 | Hollenbeck et al. ........ 166/307 |
| 4,846,277 | A | 7/1989 | Khalil et al. |
| 4,861,500 | A | 8/1989 | Hodge |
| 5,009,799 | A * | 4/1991 | Syrinek et al. ............. 507/240 |
| 5,024,276 | A * | 6/1991 | Borchardt ................ 166/308.6 |
| 5,215,596 | A | 6/1993 | Van Slyke .................... 134/26 |
| 5,373,901 | A | 12/1994 | Norman et al. ............. 166/300 |
| 5,385,206 | A | 1/1995 | Thomas ...................... 166/269 |
| 5,424,285 | A * | 6/1995 | Stacy et al. ................. 507/202 |
| 5,591,701 | A | 1/1997 | Thomas ...................... 507/240 |
| 5,604,186 | A | 2/1997 | Hunt et al. ................. 507/204 |
| 5,614,473 | A | 3/1997 | Dino et al. ................. 507/202 |
| 5,990,052 | A * | 11/1999 | Harris ........................ 507/214 |
| 6,113,809 | A | 9/2000 | Dino et al. ................. 252/307 |
| 6,148,932 | A | 11/2000 | Argillier et al. .............. 175/65 |
| 6,258,859 | B1 * | 7/2001 | Dahayanake et al. ......... 516/77 |
| 6,286,601 | B1 | 9/2001 | Argillier et al. ............ 166/309 |
| 6,306,800 | B1 | 10/2001 | Samuel et al. ............. 507/129 |
| 6,357,527 | B1 | 3/2002 | Norman et al. ............. 166/300 |
| 6,454,008 | B1 | 9/2002 | Chatterji et al. ............ 166/308 |
| 6,460,632 | B1 | 10/2002 | Chatterji et al. ............. 175/66 |
| 6,729,408 | B2 | 5/2004 | Hinkel et al. ............... 166/308 |
| 6,761,220 | B2 | 7/2004 | Blauch et al. .............. 166/307 |
| 6,945,329 | B2 * | 9/2005 | Harris et al. ............. 166/308.6 |
| 2004/0200616 | A1 | 10/2004 | Chatterji et al. |

OTHER PUBLICATIONS

SPE 73730 entitled "High-pH Clay Instability Rating" by Rick Gdanski, Dated Feb. 2002.
SPE 64983 entitled "Impact of Clay Acidity on the pH Invading Fluids" By Rick Gdanski, dated Feb. 2001.

* cited by examiner

*Primary Examiner*—Philip C. Tucker
(74) *Attorney, Agent, or Firm*—Craig W. Roddy; Robert A. Kent; Conley Rose, P.C.

(57) ABSTRACT

Fracturing fluids and methods of fracturing a subterranean formation using such fluids are provided. A fracturing fluid having a first pH is foamed by introducing a gas to the fluid. The fracturing fluid comprises a surfactant that facilitates formation of the foam at the first pH. The foamed fracturing fluid is subsequently pumped to the subterranean formation to fracture it. The pH of the fracturing fluid is then changed to a second pH at which the surfactant facilitates reduction of the foam. The fracturing fluid releases proppant contained in the fluid to the subterranean formation. The fracturing fluid is then allowed to flow back to the surface. It can be recycled by changing the pH of the fracturing fluid back to the first pH and adding a gas to the fluid, causing it to foam again.

13 Claims, No Drawings

RECYCLABLE FOAMED FRACTURING FLUIDS AND METHODS OF USING THE SAME

CROSS-REFERENCE TO RELATED APPLICATIONS

This is a divisional application of U.S. patent application Ser. No. 10/396,606, filed Mar. 25, 2003 now U.S. Pat. No. 6,986,392, and entitled "Recyclable Foamed Fracturing Fluids and Methods Of Using The Same", and is related to U.S. patent application Ser. No. 10/684,644, filed Oct. 10, 2003 now U.S. Pat. No. 6,966,379 and entitled "Methods of Fracturing A Subterranean Formation Using A pH Dependent Foamed Fracturing Fluid", each of which is hereby incorporated by reference herein in its entirety.

FIELD OF THE INVENTION

This invention generally relates to fracturing fluids and methods for their use in fracturing subterranean formations. More specifically, the invention relates to recyclable foamed fracturing fluids that can be used more than once to fracture a subterranean formation without replenishing the components in the fluids.

BACKGROUND OF THE INVENTION

Natural resources such as gas, oil, minerals, and water residing in a subterranean formation can be recovered by drilling wells into the formation. The fluids in the subterranean formation are driven into the wells by, for example, pressure gradients that exist between the formation and the wells, the force of gravity, displacement of the fluids using pumps or the force of another fluid injected into the wells. The production of such fluids is commonly increased by hydraulically fracturing the subterranean formations. That is, a viscous fracturing fluid is pumped into a well to a subterranean formation at a rate and a pressure sufficient to form fractures that extend into the formation, providing additional pathways through which the fluids can flow to the wells.

Particulate matter known as a proppant, e.g., graded sand, bauxite, or resin coated sand, is dispersed throughout the fracturing fluid. The proppant is suspended in the fracturing fluid such that it is deposited into the fractures created by the pressure exerted on the fracturing fluid. The presence of the proppant in the fractures holds the fractures open after the pressure exerted on the fracturing fluid has been released. Otherwise, the fractures would close, rendering the fracturing operation useless. Ideally, the proppant has sufficient compressive strength to resist crushing.

The fracturing fluid is usually a water-based fluid containing a gelling additive to increase the viscosity of the fluid. The gelling additive thus reduces leakage of liquid from the fractures into the subterranean formation and improves proppant suspension capability. The gelling additive is commonly a polymeric material that absorbs water and forms a gel as it undergoes hydration. A foaming surfactant is added to the fracturing fluid. A gas is mixed with the fracturing fluid to produce a foamed fracturing fluid, thus ensuring that the pressure exerted by the fracturing fluid on the subterranean formation exceeds the fracture gradient (psi/ft.) to create the fracture. The surfactant facilitates the foaming and stabilization of the foam produced when the gas is mixed with the fracturing fluid.

After a fracturing fluid has been used to form fractures in a subterranean formation, it is usually returned to the surface. It would be desirable to have the ability to recycle the fracturing fluid to form additional fractures in the same subterranean formation or to form fractures in one or more different subterranean formations. However, conventional fracturing fluids are not suitable for recycling. A need therefore exists for a fracturing fluid that can be recycled several times to fracture one or more subterranean formations.

SUMMARY OF THE INVENTION

According to an embodiment, methods of fracturing subterranean formations include providing a fracturing fluid having a first pH, followed by foaming the fracturing fluid by introducing a gas to the fluid. The fracturing fluid comprises a surfactant that facilitates formation of the foam at the first pH, which can be acidic or basic depending on the type of surfactant used. The foamed fracturing fluid is subsequently pumped to the subterranean formation to fracture it. The pH of the fracturing fluid is then changed to a second pH at which the surfactant facilitates reduction of the foam, thereby defoaming the fracturing fluid. The nature of the second pH (i.e., acidic or basic), is opposite that of the first pH. The fracturing fluid releases proppant contained in the fluid to the subterranean formation. The fracturing fluid is then allowed to flow back to the surface. It can be recycled to the same or a different subterranean formation by changing the pH of the fracturing fluid back to the first pH and adding a gas to the fluid, causing it to foam again. Preferably, the fracturing fluid can be re-foamed multiple times in this manner with minimal or no additional amounts of gelling additive or surfactant being added to the fracturing fluid beyond the amounts, if any, initially present in the fracturing fluid.

In an embodiment, fracturing fluids include a surfactant capable of allowing the fluids to be foamed at a first pH and defoamed at a second pH. The surfactant may be a tertiary alkyl amine ethoxylate, which is a cationic compound, or it may be a mixture of an amphoteric compound and an anionic compound. In this case, the first pH at which the fracturing fluid can be foamed is greater than about 9, and the second pH at which the fluid can be defoamed is less than about 6. Alternatively, the surfactant may comprise a mixture of an amphoteric compound and a cationic compound such that the first pH at which the fracturing fluid can be foamed is less than about 6 and the second pH at which the fluid can be defoamed is greater than about 9.

DETAILED DESCRIPTION OF THE PREFERRED EMBODIMENTS

According to some embodiments, fracturing fluids for fracturing a subterranean formation comprise water, surfactants, gelling additives, and proppants, wherein the surfactants enable the fracturing fluids to be foamed at a first pH and defoamed at a second pH. A foamed fracturing fluid is herein defined as a fracturing fluid that contains gas dispersed in a liquid, wherein the volume of gas depends on the quality of the foam, which is directly proportional to the half-life of the foam. The fracturing fluid can be foamed and defoamed by simply changing its pH and thus does not require the addition of a gelling agent breaker such as an enzyme or an oxidizing agent to defoam the fluid. Otherwise, the breaker could degrade the gelling additive. In the absence of the breaker, the fracturing fluid can be recycled multiple times for use in fracturing one or more subterranean formations without having to replenish the gelling additive and the surfactant.

The particular pH at which the fracturing fluid can be foamed by the addition of a gas and the particular pH at which it undergoes defoaming depend on the nature of the surfactant. Without being limited by theory, it is believed that the surfactant facilitates the formation of foam when the fracturing fluid is at a first pH by reducing the surface tension between the gas and the liquid therein, thus promoting and stabilizing the gas-liquid dispersion. On the other hand, the surfactant facilitates reduction of the foam when the fluid is changed to a second pH. It is further theorized that at the second pH, the fracturing fluid does not have the ability to reduce the surface tension between the gas and the liquid.

One suitable surfactant that may be used in the fracturing fluid is a tertiary alkyl amine ethoxylate (a cationic surfactant). The tertiary alkyl amine may be changed from a foaming surfactant (i.e., a surfactant that facilitates foaming of the fracturing fluid) to a defoaming surfactant (i.e., a surfactant that facilitates defoaming of the fracturing fluid) by the addition of a hydrogen ion. It may then be changed back to a foaming surfactant by the addition of a hydroxide ion. The following formula represents the ability of tertiary alkyl amine to be changed from a foaming surfactant to a defoaming surfactant:

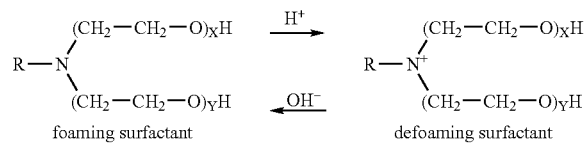

where R is an alkyl group and X and Y vary from about 2 to about 15 moles of ethylene oxide, preferably from about 10 to about 15 moles of ethylene oxide. Triton RW-100 surfactant (X and Y=10 moles of ethylene oxide) and Triton RW-150 surfactant (X and Y=15 moles of ethylene oxide) are examples of tertiary alkyl amine ethoxylates that may be purchased from Dow Chemical Company. For the tertiary alkyl amine ethoxylate surfactant, the first pH at which the fracturing fluid foams when a gas is added thereto is greater than about 9. Also, the second pH at which the fracturing fluid defoams is less than about 6.

In another embodiment, the fracturing fluid comprises an amphoteric surfactant and an anionic surfactant. The relative amounts of the amphoteric surfactant and the anionic surfactant in the surfactant mixture are from about 32 to about 45% by weight of the surfactant mixture and from about 55 to about 68% by weight of the surfactant mixture, respectively. As used throughout the specification, "%" represents "percent." The amphoteric surfactant may be lauryl amine oxide, a mixture of lauryl amine oxide and myristyl amine oxide (i.e., a lauryl/myristyl amine oxide), cocoamine oxide, lauryl betaine, oleyl betaine, or combinations thereof, with the lauryl/myristyl amine oxide being preferred. Such amine oxides are generally represented by the formula:

where R is $C_{12}$ (lauryl), $C_{12-14}$ (lauryl/myristyl), or $C_{8-12}$ (coca). Further, such betaines are generally represented by the formula:

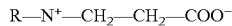

where R is $C_{12}$ (lauryl) or $C_{18}$ (oleyl). Such amine oxides and betaines are commercially available from Chemron, a Lubrizol Co., of Paso Robles, Calif. The anionic surfactant may be $C_{4-12}$ alcohol ether sulfate, α-olefin sulfonate, sulfonated $C_{1-5}$ alcohol substituted with from about 12 to about 40 moles of ethylene oxide, sodium laureth-2-sulfate, laureth-3-sulfate, and combinations thereof, e.g., $C_{4-12}$ alcohol ether sulfate containing 1.5 to 3 moles of ethylene oxide combined with the α-olefin sulfonate ($C_{12-14}[OH]SO_3^-$ $Na^+$), with the alcohol ether sulfate and the α-olefin sulfonate being preferred. When an amphoteric surfactant and an anionic surfactant are used in the fracturing fluid, the first pH at which the fracturing fluid foams when a gas is added thereto is greater than about 9. Also, the second pH at which the fracturing fluid defoams is less than about 6.

In yet another embodiment, the fracturing fluid comprises an amphoteric surfactant and a cationic surfactant. The relative amounts of the amphoteric surfactant and the cationic surfactant in the surfactant mixture are from about 30 to about 40% by weight of the surfactant mixture and from about 60 to about 70% by weight of the surfactant mixture, respectively. The amphoteric surfactant may be at least one of the amphoteric surfactants mentioned above, i.e., lauryl amine oxide, a mixture of lauryl amine oxide and myristyl amine oxide (i.e., a lauryl/myristyl amine oxide), cocoamine oxide, lauryl betaine, and oleyl betaine, with the lauryl/myristyl amine oxide being preferred. The cationic surfactant may be cocoalkyltriethyl ammonium chloride, hexadecyltrimethyl ammonium chloride, or combinations thereof, with a 50/50 mixture by weight of the cocoalkyltriethyl ammonium chloride and the hexadecyltrimethyl ammonium chloride being preferred. In this case, the first pH at which the fracturing fluid foams is less than about 6, and the second pH at which the fracturing fluid defoams is greater than about 9.

The fracturing fluid is preferably a water-based composition having a balance of water after taking other components of the fracturing fluid into account. The fracturing fluid may contain fresh water or salt water, e.g., brines and seawater. The amount of surfactant present in the water preferably ranges from about 0.5 to about 2.0% by weight of the water. The particular amount of the surfactant used in the fracturing fluid depends on the required degree of foam stability, which is directly proportional to the half-life of the foam.

In addition, the fracturing fluid includes a gelling additive, also known as a gelling agent or a viscosifying agent. As used herein, gelling additive refers to a material capable of forming the fracturing fluid into a gel, thereby increasing its viscosity. The amount of the gelling additive present in the fracturing fluid preferably ranges from about 0.125 to about 0.375% by weight of the water. Examples of suitable gelling additives include, but are not limited to, natural or derivatized polysaccharides that are soluble, dispersible, or swellable in an aqueous liquid, modified celluloses and derivatives thereof, and biopolymers. Examples of polysaccharides include: galactomannan gums such as gum ghatti, gum karaya, tamarind gum, tragacanth gum, guar gum, and locust bean gum; modified gums such as carboxyalkyl derivatives, e.g., carboxymethylguar, and hydroxyalkyl derivatives, e.g., hydroxypropylguar; and doubly derivatized gums such as carboxymethylhydroxypropylguar. Examples of water-soluble cellulose ethers include carboxymethylcellulose, hydroxyethylcellulose, methylhydroxypropyl-cellulose, and carboxymethylhydroxyethylcelluose. Examples of biopolymers include xanthan gum and welan gum.

Examples of other suitable gelling additives include, but are not limited to, water dispersible hydrophillic organic polymers having molecular weights ranging from about 1 to about 10,000,000 such as polyacrylamide and polymethacrylamide, wherein about 5% to about 7.5% are hydrolyzed to carboxyl groups and a copolymer of about 5% to about 70% by weight acrylic acid or methacrylic acid copolymerized with acrylamide or methacrylamide.

Examples of still more suitable gelling additives include, but are not limited to, water soluble polymers such as a terpolymer of an ethylenically unsaturated polar monomer, an ethylenically unsaturated ester, and a monomer selected from acrylamido-2-methylpropane sulfonic (AMPS) acid or N-vinylpyrrolidone; and a terpolymer of an ethylenically unsaturated polar monomer, an ethylenically unsaturated ester, AMPS acid, and N-vinylpyrrolidone. Other suitable gelling additives are polymerizable water soluble monomers, such as acrylic acid, methacrylic acid, acrylamide, and methacrylamide.

Of the foregoing gelling additives, galactomannans, cellulose derivatives, and biopolymers are preferred. Preferred galactomannans are guar, hydroxypropylguar, and carboxymethylhydroxypropylguar. Preferred cellulose derivatives are hydroxyethylcellulose, carboxymethylhydroxyethylcellulose, and hydroxyethylcellulose grafted with vinyl phosphonic acid. Of the foregoing biopolymers, xanthan gum is preferred. The amount of xanthan gum present in the fracturing fluid is preferably in the range of from about 10 to about 30 pounds (lbs)/1,000 gallons (gal) of fracturing fluid. Additional disclosure regarding the foregoing gelling additives can be found in U.S. Pat. No. 6,454,008, which is incorporated by reference herein in its entirety.

A proppant, i.e., particulate material, for preventing fractures formed in the subterranean formation from closing may be disposed throughout the fracturing fluid. Examples of suitable proppants include, but are not limited to, resin coated or uncoated sand, sintered bauxite, ceramic materials, and glass beads. The proppant is preferably present in the fracturing fluid in an amount ranging from about 5 to about 10 pounds/gallon of the fluid. A bacteriacide may also be added to the fracturing fluid for the purpose of preventing or alleviating a bacterial attack. Examples of suitable bacteriacides include, but are not limited to, glutaric aldehyde and hexahydro-1,3,6-tris(hydroxyethyl)-S-triazne. The concentration of the bactericide added to the fracturing fluid preferably ranges from about 0.1 to about 0.15 gallon of bactericide per 1,000 gallons of the water.

When the surfactant contained in the fracturing fluid is tertiary alkyl amine ethoxylate or a mixture of amphoteric and anionic surfactants, the fracturing fluid preferably also includes an encapsulated acid or an acid producing compound for performing a delayed release of an acid in the fracturing fluid. The amount of encapsulated acid or acid producing compound in the fracturing fluid should be sufficient to lower the pH of the fracturing fluid to less than about 6. Examples of suitable encapsulated acids include, but are not limited to, encapsulated formic acid, encapsulated citric acid, encapsulated fumaric acid, and encapsulated mineral acids, e.g., hydrochloric acid. The acids may be encapsulated in accordance with the methods described in U.S. Pat. Nos. 5,373,901, 5,604,186, and 6,357,527 and U.S. patent application Ser. No. 10/062,342, filed on Feb. 1, 2002 and entitled "Treatment of a Well with an Encapsulated Liquid and Process for Encapsulating a Liquid," each of which is incorporated by reference herein in its entirety. Examples of suitable acid producing compounds include, but are not limited to, ethyl acetate, ethyl formate, and the acid producing compounds described in U.S. Pat. No. 4,664,851, which is incorporated by reference herein in its entirety.

According to preferred embodiments, the foregoing fracturing fluid may be used to fracture a subterranean formation. The fracturing fluid is formed by first adding the bacteriacide to an aqueous salt solution, e.g., an aqueous solution containing 2% KCl by weight of the water, followed by adding the gelling additive to the solution. After the gelling additive hydrates, the surfactant is added to the solution, and the solution is mixed. If the surfactant is a tertiary alkyl amine ethoxylate or a mixture of amphoteric and anionic surfactants, the pH of the resulting fracturing fluid is raised to greater than about 9 by the addition of a basic solution such as an NaOH, KOH, $Ca(OH)_2$, or sodium carbonate solution. The encapsulated acid or acid producing compound is also added to this fracturing fluid for subsequently lowering the pH of the fluid downhole. On the other hand, if the surfactant is a mixture of amphoteric and cationic surfactants, the pH of the fracturing fluid is lowered to less than about 6 by the addition of an acid solution such as an acetic acid, formic acid, or mineral acid (e.g., HCl) solution. The encapsulated base or base producing compound is also added to this fracturing fluid for subsequently raising the pH of the fluid downhole.

The foamed fracturing fluid is subsequently pumped into a well penetrating the subterranean formation. As the fracturing fluid is being pumped into the well, a sufficient amount of gas is added to the fracturing fluid to form a foam in the presence of the surfactant. The gas may be, for example, nitrogen. The foamed fracturing fluid is pumped to the subterranean formation at a pump pressure sufficient to exceed the fracturing gradient and start fracturing the subterranean formation. After the initial fracturing of the subterranean formation, the proppant can be added to the fracturing fluid as it continues to be pumped into the well. The fracturing fluid can be pumped downhole for a period of time sufficient to achieve a desired amount of fracture geometry in the subterranean formation. The acid or base contained in the fracturing fluid is then released, causing the pH of the fracturing fluid to change to the second pH at which the fluid defoams. Due to the static condition of the fracturing fluid and to gravity, the proppant begins settling such that it becomes deposited in the fractures of the subterranean formation. The proppant holds the fractures open after the fracturing fluid is removed. The fracturing fluid is then flowed back to the surface by releasing the pressured applied to the fluid. At the surface, the fracturing fluid is passed to a holding tank or vessel and contacted with an acid or base to change its pH back to the first pH at which the fluid foams by the addition of a gas. The fracturing fluid is then re-foamed and recycled to the same or a different subterranean formation to fracture that formation as described previously. Due to the presence of the previously described surfactant in the fracturing fluid, the fluid preferably can be recycled multiple times in this manner without adding additional surfactant and gelling additive to the fracturing fluid. The mean foam quality of the fracturing fluid preferably remains in the range of about 50 to about 90 despite being recycled one or more times. The foam quality of the fracturing fluid is represented by the following equation:

$$\text{Foam Quality} = \frac{\text{Total Volume of Foam} - \text{Liquid}}{\text{Total Volume of Foam}} \times 100$$

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Example 1

The following example illustrates the measurement of foam quality. A fracturing fluid in accordance with the present invention was prepared by blending 1 Liter (L) of brine water containing 2 weight (wt.) % KCl by weight of the water and 3.6 grams of a carboxymethylhydroxypropyl guar gelling additive in a Constant Mixer Model 30–60, which is commercially available from Chandler Engineering of Tulsa, Okla. The gelling additive was allowed to hydrate for 30 minutes. A BE-4 bactericide manufactured by Ondeo Nalco of Houston, Tex. was added to the hydrated gel to prevent it from being attacked by bacteria. The pH of the hydrated gel was raised to 10 by adding a buffer of ammonium acetate and acetic acid. Then 100 milliliters (mL) of the fracturing fluid was placed in a 1 L plastic beaker, followed by the addition of 0.5 weight % RW-100 surfactant by weight of the fracturing fluid. The fracturing fluid was vigorously agitated until the foam reached maximum height in the beaker. The foamed fluid was transferred to a 500 mL graduated cylinder, and the total volumes of the fracturing fluid and of the foam were measured. The foam quality was calculated to be 68.

Example 2

The following example illustrates preparing and using a recyclable fracturing fluid. A fracturing fluid in accordance with the present invention was prepared by placing 1 L of brine water containing 2 wt. percent % KCl by weight of the water in a Constant Mixer Model 30–60. Then 2.4 grams of hydroxypropyl guar (20 pounds/1000 gallons) gelling additive were vigorously agitated in brine water, and the gelling additive was allowed to fully hydrate for 30 minutes. A BE-4 bactericide was added to the hydrated gel to prevent bacterial growth on the gel. The pH of the hydrated gel was raised to 10 by adding 0.1 gram of a buffer of ammonium acetate and acetic acid. Then 100 mL of the fracturing fluid was added to a 1 L beaker and mixed at a low speed with 5 lbs/gal of 20–40 mesh fracturing sand. A foaming surfactant mixture at a concentration of 0.5 wt. % by weight of the water was added to the fracturing fluid. The surfactant mixture contained 40 wt. % lauryl/myristyl amine oxide, 8 wt. % alcohol ether sulfate with 3 moles of ethylene oxide, 14 wt. % alcohol ether sulfate with 3.5 moles ethylene oxide, 8 wt. % α-olefin sulfonate, and 30 wt. % water by weight of the mixture. The fluid was foamed by vigorously agitating it until the foam filled the beaker. The foamed fracturing fluid was transferred to a 500 mL graduated cylinder, and the time required for the fracturing sand to completely settle to the bottom of the graduated cylinder was noted as 4 minutes. The pH of the fluid was adjusted to 4 by the addition of a small amount of HCl. Lowering the pH in this manner completely destroyed the foam. The fracturing fluid was decanted into a beaker, and additional fracturing sand was added. The pH of the fluid was again raised to 10, and the fluid was vigorously agitated to form a foam therein. The time required for the sand to settle to the bottom of the graduated cylinder after re-foaming was 8 minutes. This process of foaming and defoaming was repeated 4 times, exhibiting the recyclable nature of the foamed fracturing fluid.

Comparative Example 1

A conventional fracturing fluid was prepared for comparison to the recyclable fracturing fluid prepared in Example 2. First, 1.2 grams of hydroxypropyl guar gelling additive were hydrated for 30 minutes in brine water containing 2 wt. % KCl by weight of the water. To the hydrated solution was added 0.3 gram of hemi-cellulase breaker. Then 2040 mesh sand at a concentration of 5 lbs/gal was added to the solution, followed by adding 1 wt. % cocobetaine (amphoteric surfactant) to the solution. The solution was foamed by agitating it for 30 seconds. Next, 370 mL of the resulting foamed fluid was transferred to a graduated cylinder. In 1 minute, the sand in the fluid started settling. In 12 minutes, 100 mL of liquid plus sand were observed in the graduated cylinder. In 15 minutes, 125 mL of liquid plus sand were observed in the graduated cylinder. The gel broke in 1 hour, forming a thin fluid. The viscosity of the broken fluid was measured to be 2.5 centipoise at 300 rpm using a Fann Viscometer Model 30. The broken fluid was decanted and acidified. It was agitated to form a foam therein. Then the foam immediately collapsed as soon as the foam began to defoam. The foam exhibited no stability due to lack of viscosity and texture. As such, the fracturing fluid was not suitable for recycling.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claims.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A fracturing fluid for fracturing a subterranean formation, comprising a proppant and a surfactant capable of allowing the fracturing fluid to be foamed at a first pH and defoamed at a second pH, wherein the surfactant is a tertiary alkyl amine ethoxylate generally represented by the following formula wherein the fracturing fluid is foamed at the first pH, the first pH being greater than about 9:

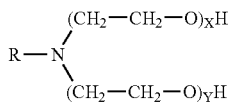

wherein R is an alkyl group, X is from about 2 to about 15, and Y is from about 2 to about 15.

2. The fracturing fluid of claim 1 wherein X is from about 10 to about 15 moles of ethylene oxide.

3. The fracturing fluid of claim 1 wherein Y is from about 10 to about 15 moles of ethylene oxide.

4. The fracturing fluid of claim 1 further comprising water.

5. The fracturing fluid of claim 4 wherein an amount of the surfactant present in the fracturing fluid ranges from about 0.5 to about 2.0 % by weight of the water.

6. The fracturing fluid of claim 4 further comprising a gelling additive for forming a gel.

7. The fracturing fluid of claim 6 wherein an amount of the gelling additive present in the fracturing fluid ranges from about 0.125 to about 0.375 % by weight of the water.

8. The fracturing fluid of claim 6 wherein the fracturing fluid is recycled to the same or different subterranean formation without adding additional surfactant and gelling additive to the fracturing fluid.

9. The fracturing fluid of claim 1 further comprising at least one additive selected from the group consisting of an encapsulated acid and an acid producing compound.

10. The fracturing fluid of claim 1 wherein an amount of the proppant present in the fracturing fluid ranges from about 5 to about 10 pounds per gallon of the water.

11. The fracturing fluid of claim 4 further comprising a bacteriacide.

12. The fracturing fluid of claim 11 wherein the bacteriacide comprises at least one additive selected from the group consisting of glutaric aldehyde and hexahydro-1,3,6-tris(hydroxyethyl)-S-triazne.

13. The fracturing fluid of claim 11 wherein a concentration of the bacteriacide present in the fracturing fluid is from about 0.1 to about 0.15 gallon of bacteriacide per 1000 gallons of the water.

* * * * *